United States Patent [19]

Schwesig et al.

[11] Patent Number: 4,460,860

[45] Date of Patent: Jul. 17, 1984

[54] METHOD AND APPARATUS FOR INCREASING THE MAXIMUM SPEED OF ROTATION OF A SYNCHRONOUS MACHINE WITH A GIVEN EXCITATION FIELD STRENGTH AND TERMINAL VOLTAGE

[75] Inventors: Günter Schwesig; Hartmut Vogt, both of Erlangen; Erich Voss, Bad Neustadt; Hans-Hermann Zander, Erlangen, all of Fed. Rep. of Germany

[73] Assignee: Siemens Aktiengesellschaft, Munich, Fed. Rep. of Germany

[21] Appl. No.: 458,040

[22] Filed: Jan. 14, 1983

[30] Foreign Application Priority Data

Feb. 5, 1982 [DE] Fed. Rep. of Germany ....... 3203911

[51] Int. Cl.$^3$ .............................................. H02P 5/40
[52] U.S. Cl. .................................... 318/721; 318/722; 318/802
[58] Field of Search ...................... 318/705, 716–723, 318/767, 798–811

[56] References Cited

U.S. PATENT DOCUMENTS

| 4,227,138 | 10/1980 | Espelage et al. | 318/810 |
| 4,330,741 | 5/1982 | Nagase et al. | 318/809 |
| 4,335,343 | 6/1982 | Dreiseitl et al. | 318/811 |
| 4,338,558 | 7/1982 | Okamatsu et al. | 318/811 |
| 4,348,627 | 9/1982 | Fulton | 318/809 |
| 4,366,428 | 12/1982 | Bai et al. | 318/809 |

Primary Examiner—G. Z. Rubinson
Assistant Examiner—Arthur G. Evans
Attorney, Agent, or Firm—Kenyon & Kenyon

[57] ABSTRACT

An apparatus and method for increasing the maximum speed of rotation of a synchronous machine having constant excitation field strength is disclosed. The synchronous machine is preceded by a converter, which has an adjusted current reference value as an input. The adjusted current reference value comprises an active-current reference value and a reactive-current reference value. For actual speeds $n_{ist}$, the absolute value $|n_{ist}|$ of which is above a predetermined value $n_o$, the amplitude of the active-current reference value is limited to a value which is inversely proportional to the factor $|n_{ist}|/n_o$. The value $n_o$ is a predetermined speed at which the sum of the magnet wheel voltage of the synchronous machine and the voltage drop in the stator winding is maximally equal to the largest possible output voltage of the converter. To obtain the adjusted current reference value, a reactive-current reference value shifted 90° relative to the active-current reference value is vectorially added to the active-current reference value, the amplitude of the reactive-current reference value being proportional to the factor $(1-n_o/|n_{ist}|)$. A reactive current is thus generated in the machine. The voltage drop across the reactance of the synchronous machine caused by this reactive current is 180° out of phase with the speedproportional magnet-wheel voltage. The magnet wheel voltage can therefore be increased beyond the terminal voltage, so that the speed of rotation of the machine can be increased.

8 Claims, 8 Drawing Figures

METHOD AND APPARATUS FOR INCREASING THE MAXIMUM SPEED OF ROTATION OF A SYNCHRONOUS MACHINE WITH A GIVEN EXCITATION FIELD STRENGTH AND TERMINAL VOLTAGE

BACKGROUND OF THE INVENTION

The present invention relates to a method and apparatus for increasing the maximum speed of rotation of a synchronous machine having constant excitation field strength, and which is preceded by a converter into which an active-current reference value is fed, the phase of which is controlled in dependence on the position of the rotor of the synchronous machine, and the amplitude of which is controlled in dependence on a speed-of-rotation reference value.

Converters of the type mentioned above for controlling synchronous machines are commercially available. In order to increase the maximum speed of rotation at a given converter output voltage, it is known to reduce the excitation field strength. This presupposes, however, a separate control device for the field current, and is not possible for instance, in the case of synchronous machines excited by permanent magnets. Additionally, it is apparent that the converter output voltage is constrained to specified limits, beyond which the output voltage cannot go.

It is therefore an object of the invention to provide a method and apparatus whereby the maximum speed of rotation of a synchronous machine can be increased while the excitation field strength and the stator terminal voltages remain within given limits.

SUMMARY OF THE INVENTION

This and other objects of the invention are achieved by the provision that for actual motor speeds $|n_{ist}| > n_o$, where $n_o$ is a predetermined speed value, the amplitude of the active-current reference value is limited to a value inversely proportional to the factor $n_{ist}/n_o$ and a reactive-current reference value shifted $+90°$ relative to the active-current reference value is added to the active-current reference value to form an adjusted current reference value for controlling the conveter, the amplitude of the reactive current reference value being proportional to $1 - n_o/n_{ist} \cdot n_o$ is a predetermined speed value for which the sum of the magnet-wheel voltage of the synchronous machine and the voltage drop in the stator winding is maximally equal to the highest possible output voltage of the converter.

Through the addition of the reactive-current reference value, a voltage drop which is opposed to the magnet-wheel voltage is generated across the leakage and synchronous reactance of the machine, denoted herein as X. The magnet-wheel voltage, denoted herein as E, can thus become larger than the output voltage of the converter because of this voltage drop. An increase of the maximum speed of rotation of the synchronous machine is therefore possible. In order not to obtain an increased voltage drop across the reactance X due to the active current with the increase of the speed of rotation, the active current is reduced inversely proportional to the speed.

Preferably, the value of the speed of rotation $n_o$ is proportional to the line voltage of the supply network feeding the converter. The value $n_o$ of the speed of rotation, at which the reduction of the active-current reference value and the addition of the reactive-current reference value takes effect, is thereby adapted to the maximum output voltage of the converter.

In a circuit arrangement for carrying out the method having a speed controller, to which the deviation of the actual speed of rotation from the desired speed of rotation is fed and which is followed via a first coefficient multiplier by a first vector rotator, the control inputs of which are connected to a rotor position transmitter and where the active-current reference value is present at the output of the first vector rotator, the speed controller is followed by a first limiter which limits the output signal of the speed control to a value inversely proportional to the factor $|n_{ist}|/n_o$ and the actual speed value $|n_{ist}|$ is fed to a first characteristic generator, which forms therefrom a quantity $I_B^*$ which for actual speed values of $|n_{ist}| < n_o$ is equal to zero and for actual speed values $|n_{ist}| > n_o$ is proportional to $(1 - n_o/n_{ist})$. The output of the first characteristic generator is connected via a second coefficient multiplier to a second vector rotator, the control inputs of which are connected to the rotor position pickup, and the output signal of which is shifted 90° relative to the rotor position signal. The corresponding respective outputs of the two vector rotators are coupled to adding stages, at the output of each of which the adjusted current reference value is present which is then coupled to the converter.

The method according to the invention can thereby be realized with few elements.

Preferably, the control input of the first limiter is connected to the output of a second characteristic generator, at the input of which the absolute value of the actual speed value is present. The characteristic generator furnishes a constant output signal for actual speed values $|n_{ist}| < n_o$ and for actual speed values $|n_{ist}| > n_o$ an output signal which is inversely proportional to the factor $|n_{ist}|/n_o$. The limiter is thus controlled by the second characteristic generator in such a way that the active-current reference value is limited for actual speed values $|n_{ist}| > n_o$.

The second characteristic generator preferably comprises a first summing amplifier, at the inverting input of which the absolute value of the actual speed value is present and at the non-inverting input of which the speed value $n_o$ is present. The first summing amplifier is connected by feedback diodes as an ideal rectifier and the output of the first summing amplifier is coupled to one input of a second summing amplifier wherein the maximum value for the active-current reference value is also coupled to the same input of the second summing amplifier. In such a characteristic generator, the function $1/n$ is approximated by a linearly declining function. However, this approximation is sufficient for the speed range of interest.

The limiter may comprise two oppositely polarized diodes which are connected to each other, the common junction point of which is connected via a resistor to the output of the speed controller. The second non-common terminals of the diodes are coupled, respectively, directly and via an inverter to the output of the second characteristic generator. The limiter can thus be realized by two diodes. In the preferred embodiment, operational amplifiers operated as ideal diodes are employed.

The first characteristic generator may comprise a summing amplifier, at the non-inverting input of which the absolute value of the actual speed is present and at the inverting input of which the value $n_o$ is present. The summing amplifier is connected by feedback diodes as an ideal rectifier and its output is coupled via a first diode to the absolute value of the actual speed value and via an impedance matching stage to the output of the characteristic generator. A characteristic generator constructed in this manner furnishes an approximation function for the factor $(1 - n_o/|n_{ist}|)$, but which is sufficiently accurate for the purposes described.

BRIEF DESCRIPTION OF THE DRAWINGS

The present invention will be explained in greater detail with reference to the drawings, in which.

DETAILED DESCRIPTION

Figure 1:
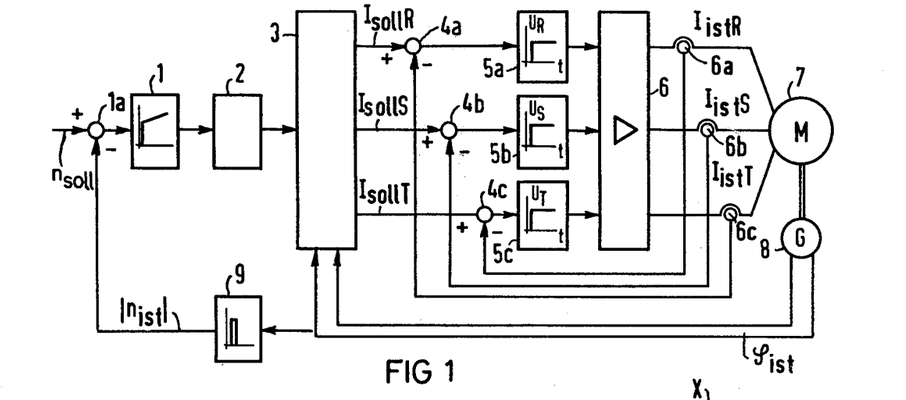
FIG. 1 is the block diagram of a known circuit arrangement of an automatically controlled synchronous machine.

Converters of the type mentioned above for controlling a synchronous machine are known. An example of such an arrangement, also called an automatically controlled synchronous machine, is shown in FIG. 1. A converter 6 feeds a synchronous motor 7, on the shaft of which a rotor position pickup 8 is disposed. From the rotor position signal $\phi_{ist}$, an actual absolute speed-of rotation value $|n_{ist}|$ is formed by a device 9, for instance, a differentiator. This acutal speed-of-rotation value $|n_{ist}|$ is compared in a subtraction circuit 1a with a speed-of-rotation reference value $n_{soll}$. The difference between the reference and the actual value is fed to a speed controller 1 which has a PI characteristic. Congtrollers of this type are known. The speed controller 1 is followed by a coefficient multiplier 2. The reference value for the amplitude of the active current $I_{Wsoll}$ is present at the output of the coefficient multiplier 2. This reference value is fed to a vector rotator 3. At the control inputs of the vector rotator 3, the output signal of the rotor position pickup 8 is present. Three rotating vectors for the desired (reference) currents $I_{sollR}$, $I_{sollS}$ and $I_{sollT}$ are thereby formed in the individual phases of the synchronous machine. The magnitude of these vectors is equal to the active-current reference value $I_{Wsoll}$. The phase of the vectors is controlled by the rotor position signal $\phi_{ist}$ in such a manner that they are in phase with the corresponding magnet-wheel voltages of the synchronous machine, i.e., that the reference currents $I_{sollR}$, $I_{sollS}$ and $I_{sollT}$ are synchronous with the corresponding magnet-wheel voltages. A vector rotator of the type required here is known, for instance, from the article "The Principle of Field Orientation, the Basis of the Transvector Control of Rotating-Field Machines", in Siemens-Zeitschrift 45, October 1971, no. 10, pages 757 to 760.

The so obtained three-phase reference values $I_{sollR}$, $I_{sollS}$ and $I_{sollT}$ are compared in the subtraction stages 4a, 4b and 4c with the corresponding actual values $I_{istR}$, $I_{istS}$ and $I_{istT}$. The actual current values $I_{ist}$ are obtained by current transformers 6a, 6b and 6c which are inserted into the leads of the synchronous motor 7. For controlling the machine currents, the output voltage of the converter 6 is used as the control variable. For this purpose, the outputs of subtraction stages 4a, 4b and 4c are connected via current regulators 5a, 5b and 5c, the outputs of which image the voltages which are required to make the reference to actual current difference zero, to the control inputs of the converter 6. The output voltage of the converter 6 is varied in the manner known per se, for instance, by pulse width modulation.

In practice, the vector rotation as well as the regulation of the current is usually performed only for two phases, since in symmetrical three-phase systems, the vectorial sum of the three sinusoidal phase currents is always zero. The value of the current for the third phase can therefore be obtained by forming the sum of the other two current values.

With the control arrangement described, sinusoidal currents are therefore impressed on the synchronous machine which are in phase with the respective induced magnet-wheel voltage and therefore generate a maximum torque.

Figures 2, 3:
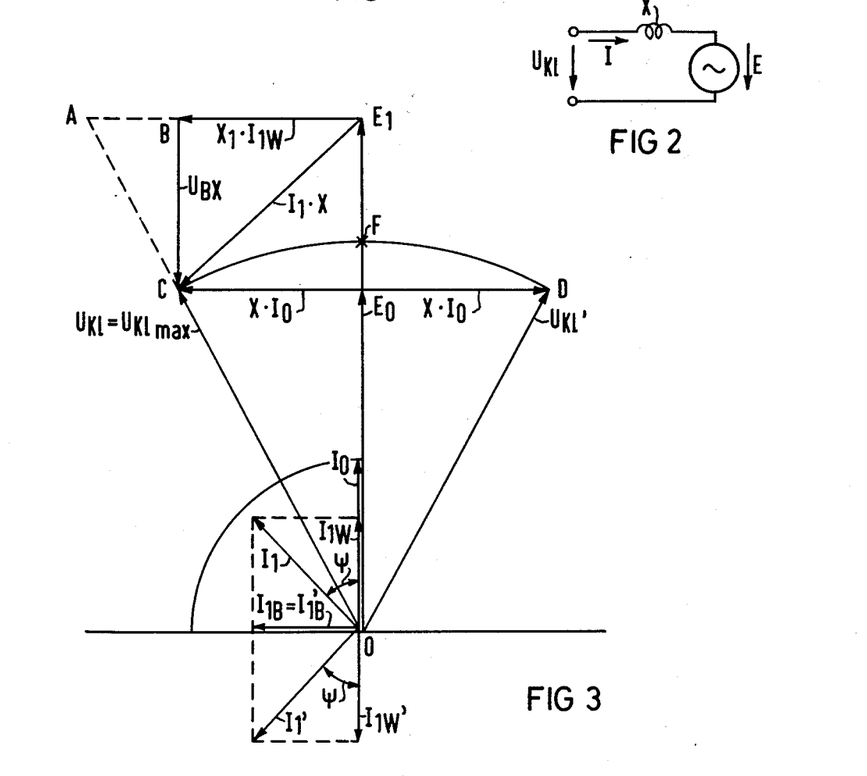
FIG. 2 is a simplified schematic diagram of one phase of a synchronous machine.
FIG. 3 is a vector diagram of the voltages and currents present in the synchronous machine.

FIG. 2 shows the equivalent single-phase circuit diagram, simplified for steady-state analysis, of a synchronous machine, neglecting the ohmic resistances in the stator winding and combining the leakage reactance and the synchronous reactance in the reactance X. If the current I is in phase with the magnet-wheel voltage E, which is ensured by the control circuit shown in FIG. 1, the voltage drop across the reactance X is 90° out of phase or perpendicular to E in the vector diagram and the amplitude of the terminal voltage $U_{Kl}$ present at the synchronous machine is obtained as:

$$U_{Kl} = \sqrt{E^2 + (I \cdot X)^2}.$$

The magnet-wheel voltage E is proportional to the actual speed of rotation $n_{ist}$ of the synchronous machine as well as the excitation field strength. For a given current I and constant excitation field strength, the maximum speed of rotation of the synchronous machine is reached when the terminal voltage $U_{Kl}$ equals the highest possible output voltage of the converter 6. In order to increase the maximum speed of rotation with a given limit for the converter output voltage, it is known to reduce the excitation field strength. This, however, presupposes a separate control device for the field current and is impossible, for instance, in the case of synchronous machines excited by permanent magnets. The circuit shown in FIG. 4 allows the maximum speed of the synchronous machine to be increased even though the converter output voltage is at a maximum and the excitation field strength is constant.

A vector diagram of a synchronous motor is shown in FIG. 3 in order to better enable comprehension of the invention. It is assumed here that the synchronous machine is at first still in normal operation, i.e., the method according to the invention has not yet been applied. The synchronous machine rotates at the speed $n_o$ and a current $I_o$ flows in the stator windings. The rotor, which rotates at the speed $n_o$, induces in the stator winding the magnet-wheel voltage $E_o$. Due to the above explained control circuit of FIG. 1, the stator current $I_o$ and the magnet-wheel voltage $E_o$ are in phase. The current $I_o$ is therefore designated in the following as an active current. The active current $I_o$ generates in the reactance X a voltage drop $X \cdot I_o$, which in the vector diagram is perpendicular to the magnet-wheel voltage $E_o$. At the terminals of the motor, a terminal voltage is therefore present which results from the addition of the vectors $E_o$ and $X \cdot I_o$. This terminal voltage $U_{K1}$ has the following absolute value:

$$|U_{K1}| = \sqrt{E_o^2 + (|I_o| \cdot X)^2}$$

If $|U_{K1}|$ is the maximum output voltage of the converter 6, i.e., $|U_{K1}| = U_{K1max}$, then the speed $n_o$ corresponding to the magnet-wheel voltage $E_o$ is equal to the maximally attainable speed $n_o$. As can be seen from the vector diagram of FIG. 3, the speed of rotation $n_o$ is proportional to the maximally possible terminal voltage $UK_{1max}$. It is furthermore proportional to the excitation field strength of the synchronous machine. Both quantities, however, cannot be changed, as assumed. There is further a certain dependence of the attainable speed $n_o$ on the magnitude of the active current $I_o$. If, for instance, the stator current $I_o = 0$, there is no voltage drop across the reactance X and the magnet-wheel voltage E can be equal to the maximum terminal voltage $U_{K1max}$ i.e., can travel up to the point F in FIG. 3. A corresponding increase of the speed of rotation goes along with this.

In the following, the dependence of the maximum speed on the active current $I_o$ will be neglected, however. Rather, a fixed value which, for instance, in the method according to the invention, is related to the maximum expected stator current $I_o$, is chosen as the value of the speed of rotation $n_o$. The limitation of the active current and the reactive-current addition thus takes effect at lower machine speeds somewhat earlier than is basically required, but this has only a minor effect on the dynamics of the synchronous machine.

If the speed n is increased beyond $n_o$, the magnet-wheel voltage E increases, for instance, to the value $E_1$ shown in FIG. 3. The voltage drop $X \cdot I_o$ across the reactance X also increases proportionally with the speed. Without additional measures, the terminal voltage $U_{K1}$ would then have to be increased to the point designated A in FIG. 3 which, however, is not possible for the reasons explained earlier. In order to obtain, with the magnet-wheel voltage $E_1$ shown, the terminal voltage $U_{K1max}$, (point C), the active current is first reduced to a value $I_{1W}$. This value is chosen so that the voltage drop $X \cdot I_{1W}$ remains equal to the voltage drop $X \cdot I_o$ for the speed $n_o$ in spite of the fact that the reactance X is higher at the higher speed. To this end, the active current $I_W$ above the speed $n_o$ is limited inversely proportional to the factor $n/n_o$. Thus one arrives at point B in the vector diagram. In order to get to point C, there is added to the current $I_{1W}$ which, like the current $I_o$ is in phase with the magnet-wheel voltage E and therefore is a pure active current, a reactive current $I_{1B}$ which leads the magnet-wheel voltage E by 90°. This reactive current $I_{1B}$ generates across the reactance X a voltage drop $U_{BX}$ which is shifted 90° relative to the reactive current $I_{1B}$ and therefore 180° relative to the magnet-wheel voltage E. The voltage drop $U_{BX}$ generated by the added reactive current $I_{1B}$ is therefore opposed to the magnet-wheel voltage E. The reactive-current component $I_{1B}$ is chosen so that the voltage drop $U_{BX}$ due thereto just compensates the increase of the magnet-wheel voltage $\Delta E = E_1 - E_o$ due to the increase in the speed beyond $n_o$. If, therefore, L is the sum of the leakage inductance and the synchronous inductance, and the magnet-wheel voltage E is equal to p x n, where p = a constant, the following relation is obtained:

$$U_{BX} = \Delta E$$

$$I_B \cdot 2\pi n \cdot L = p(n - n_o)$$

$$I_B = \frac{p}{2\pi L}\left(1 - \frac{n_o}{n}\right)$$

The reactive current component $I_B$ must therefore be chosen proportional to $1 - n_o/n$.

The active current $I_W$ must be limited, as already explained, inversely proportional to the value n above the speed $n_o$.

The considerations discussed so far apply to motor operation. However, they can also be applied analogously to generator operation as shown in the right-hand side of the vector diagram of FIG. 3, where only the active current $I_{1W}$ has an opposite sign, while the reactive current $I_{1B'}$ retains its sign.

It is therefore possible with the method shown to increase the maximum speed of rotation of the synchronous machine while the excitation field strength is preset and the supply voltage is constrained within given limits. A limit for the speed increase is imposed by the fact that with decreasing active current, the torque of the synchronous machine also naturally decreases. With decreasing torque, the ability of the synchronous machine to accelerate is also reduced, so that the latter has poorer dynamic behavior in the higher speed range. These limitations, however, do not matter in many drives, for instance, in feed drives of machine tools, which in a so-called rapid traverse mode are largely operated without load. Test results have shown that an increase of the maximum speed by a factor of 2 can be achieved without difficulty. The converter 6 feeding the synchronous machine must be designed, of course, to carry the additional reactive current and the current-carrying capacity of the synchronous machine must not be exceeded to avoid thermal overload.

Figure 4:
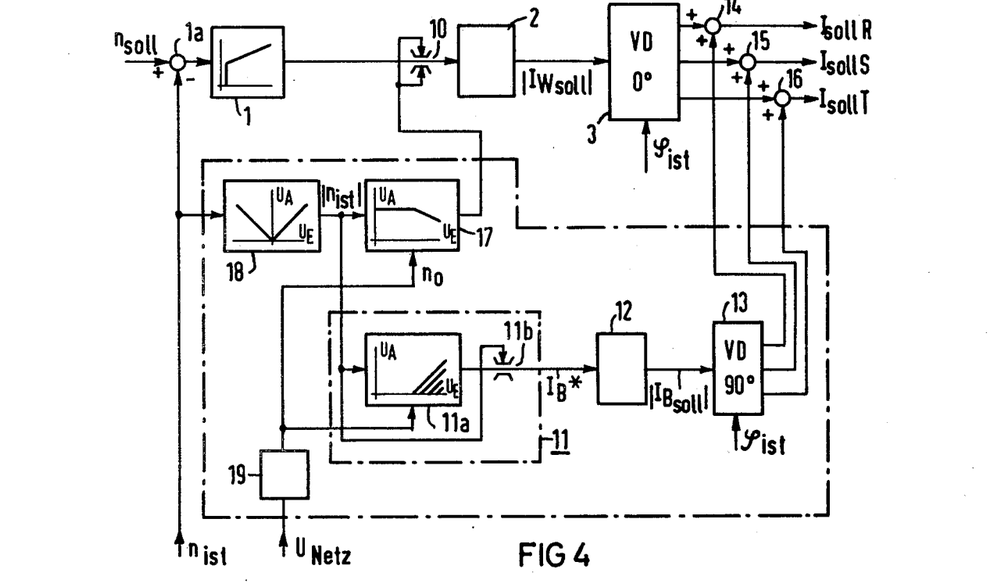
FIG. 4 is a block diagram of the circuit arrangement according to the invention illustrating how the invention is implemented in combination with the circuit of FIG. 1.

A circuit arrangement for carrying out the method is shown in FIG. 4. There, as in the known circuit of FIG. 1, the difference between the speed reference value $n_{soll}$ and the actual speed value $n_{ist}$ is formed in a subtraction circuit 1a. This difference is fed to a speed controller 1 and the output of the speed controller is coupled to coefficient multiplier 2. The output of the multiplier is coupled to a vector rotator 3 which is controlled by the output signal $\phi_{ist}$ of the rotor position pickup. The output signal of the vector rotator 3 is in phase with the actual position value $\phi_{ist}$, which is indicated by the designation 0° in the circuit symbol of the vector rotator 3. In this branch of the circuit, the only difference from the known arrangement of FIG. 1 is that a limiter 10 is inserted between the speed controller 1 and the coefficient multiplier 2. This limiter limits, according to the method described, the output signal of the speed controller 1 for actual speeds $|n_{ist}| > n_o$ inversely proportional to the factor $|n_{ist}|/n_o$. The limiter 10 is controlled by a characteristic generator 17 which delivers the corresponding limiting signal. To this end, the actual speed value $n_{ist}$ is fed to the characteristic generator 17 via an absolute-value former 18, which converts negative actual values into positive actual values, as the input variable $|n_{ist}|$. The set-in point $n_o$ may either be given as fixed or, if the line voltage is variable, be made dependent on the latter. Since the speed limit of the synchronous machine is proportional to the line voltage $U_N$ without additional measures, the measured value for the line voltage $U_{Netz}$ is fed to a parameter input of the characteristic generator 17 via a coefficient multiplier 19, at the output of which a signal proportional to the set-in point $n_o$ is present.

The circuit has a second branch, in which a reactive current component for the current reference value $I_{soll}$ is formed. This second branch contains a characteristic generator 11 which is connected via a coefficient multiplier 12 to the input of a second vector rotator 13. The second vector rotator 13 can be likewise designed as shown in the above-cited article in Siemens-Zeitschrift, October 1971, no. 10, pages 757 to 760. The output signal of vector rotator 13, however, has a phase shift of 90° relative to the actual position value $\phi_{ist}$. This can be achieved conveniently by interchanging the inputs for sin $\phi$ and cos $\phi$ in the known circuit according to FIG. 7 of the literature reference cited, and inverting the input for cos $\phi$ by the inverter 13a, (see FIG. 8) since sin (90°+$\phi$)=cos $\phi$ and cos (90°+$\phi$)=sin $\phi$. The reactive-current reference values for the individual phases present at the output of vector rotator 13 are fed to respective summers 14, 15 and 16, at the inputs of which the respective active and reactive-current reference values for the phases in question are thus present. At the output of the summers 14, 15 and 16, the respective adjusted current reference values $I_{sollR}$, $I_{sollS}$ and $I_{sollT}$ for the individual phases are present. These are used for controlling the current, as in the known circuit of FIG. 1. The current control loop shown in FIG. 1 is not shown in FIG. 4.

Figure 5:
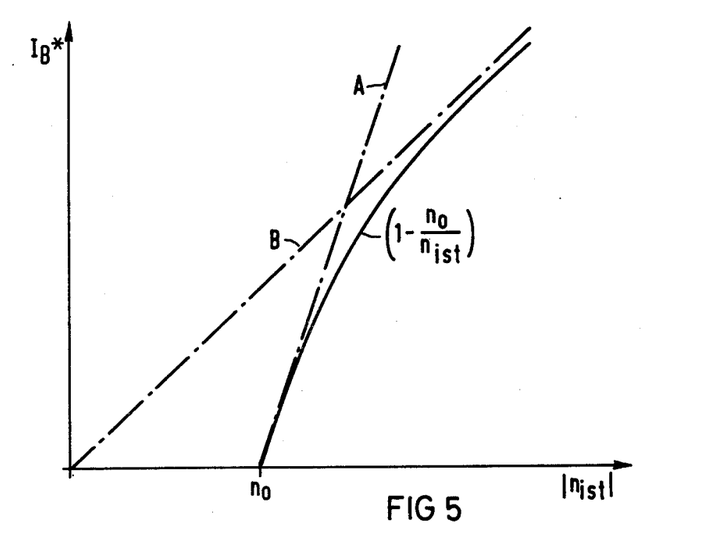
FIG. 5 shows how one of the desired signals varies with the speed of the synchronous machine and how the signal is approximated.

The absolute actual speed value $|n_{ist}|$ is likewise fed as an input variable to the characteristic generator 11. Additionally, the set-in point $n_o$ is also fed to characteristic generator 11. The characteristic of the characteristic generator 11 should basically correspond, as explained, to the function $(1-n_o/n_{ist})$, as shown in FIG. 5. In the range of interest here, however, it can be approximated by two straight lines, of which one (B) goes through the origin and the other (A) through the set-in point $n_o$. This approximation is realized by first generating, in a part 11a of the characteristic generator 11, the straight line A in dependence on the speed $|n_{ist}|$ and on the set-in point $n_o$. The output signal of the characteristic generator part 11a is then limited according to the characteristic B by a limiter 11b connected thereto. Characteristic A thereby becomes effective up to the intersection of the two characteristics A and B, and then characteristic B prevails for increasing speeds.

Figure 6:
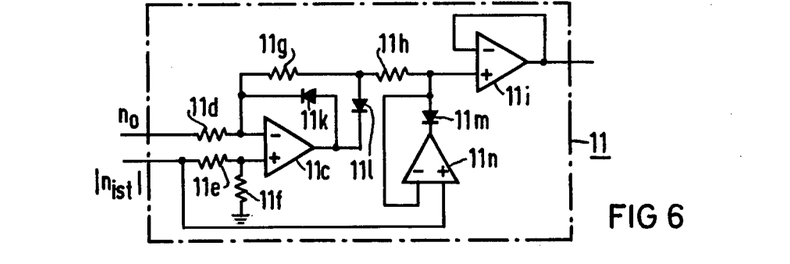
FIGS. 6, 7 and 8 are circuit diagrams of some of the blocks of FIG. 4.

An embodiment of the characteristic generator 11 is shown in FIG. 6. The values $n_o$ and $|n_{ist}|$ are fed via respective resistors 11d and 11e to the inputs of an operational amplifier 11c. The signal $|n_{ist}|$ is applied to the non-inverting input which is additionally connected to ground via a resistor 11f. The output of operational amplifier 11c is connected, via a diode 11k, the anode of which is connected to the output of the operational amplifier 11c, to its inverting input. The output of operational amplifier 11c is further connected via a diode 11l, a resistor 11h and an impedance matching stage 11i to the output of the characteristic generator 11. The junction point of the diode 11l and the resistor 11h is further connected via a further resistor 11g to the inverting input of the operational amplifier 11c. An output signal is thus formed which is proportional to the difference $|n_{ist}|-n_o$ by this portion of the characteristic generator 11, i.e., corresponding to the characteristic A. An ideal rectifier is formed by the feedback diodes 11k and 11l, which cuts off the undesired negative region of the characteristic.

To limit the output signal according to characteristic B, the junction point between the resistor 11h and the impedance matching stage 11i is coupled to the output of an operational amplifier 11n via a diode 11m. The inverting input of the operational amplifier 11n is connected to the junction point of the resistor 11h and the impedance matching stage 11i and the non-inverting input of the operational amplifier 11n is connected to the point where the absolute value of the actual speed value $n_{ist}$ is present. Via operational amplifier 11n and the diode 11m, an ideal clamping diode without threshold is realized which conducts as soon as the voltage at the junction point of the resistor 11h and the impedance matching stage 11i becomes larger than the absolute value of the actual speed value $n_{ist}$. The output signal is thus limited in accordance with characteristic B to a value which is proportional to the actual speed value $|n_{ist}|$.

Figure 7:
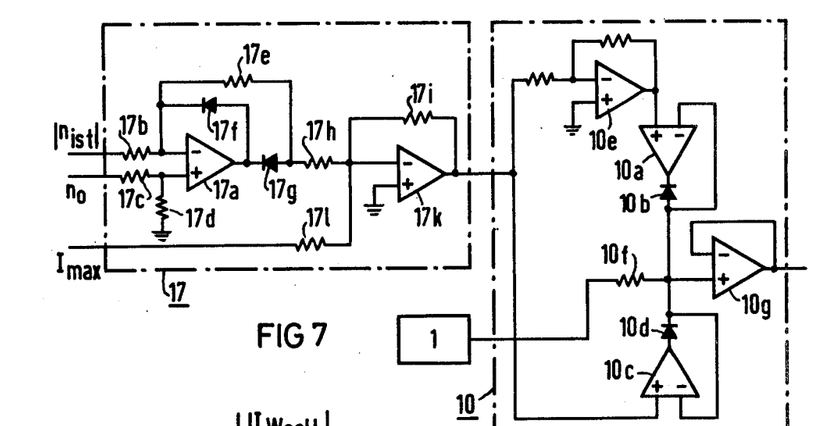

An embodiment of the characteristic generator 17 and the limiter 10 is shown in FIG. 7. The absolute value of the actual speed value $n_{ist}$ is connected via a resistor 17b to the inverting input of an operational amplifier 17a and the speed value $n_o$ is connected via a resistor 17c to the non-inverting input of the operational amplifier 17a. The non-inverting input is further connected via a resistor 17d to the reference potential of the circuit arrangement. The operational amplifier 17a has in its feedback circuit a diode 17f between its output and its inverting input, the anode of the diode 17f being connected to the output of the operational amplifier 17a. The output of the operational amplifier 17a is followed by a diode 17g, the cathode of which is connected to the output of the operational amplifier 17a. The anode of the diode 17g is connected via a resistor 17e to the inverting input of the operational amplifier 17a. The difference $n_o-|n_{ist}|$ is formed by this operational amplifier 17a, wired likewise as an ideal rectifier. Only negative values are transmitted. If the actual speed value $|n_{ist}|$ is therefore less than the speed value $n_o$, then the output voltage of the operational amplifier 17a is 0. If $|n_{ist}|$ is greater than $n_o$, a characteristic with negative slope is obtained. In order to generate therefrom the desired shape of the characteristic, a constant value $I_{max}$ must further be added, which corresponds to the maximum active current reference value. This is accomplished by a further operational amplifier 17k, the inverting input of which is connected via a resistor 17h to the diode 17g and, via a resistor 17l to the value $I_{max}$. The operational amplifier 17k has a feedback resistor 17i between its output and its inverting input. At the output of the operational amplifier 17k, a voltage is therefore present which is equal to $I_{max}$ as long as $|n_{ist}|<n_o$ and equal to $I_{max}-(|n_{ist}|-n_o)$ if $|n_{ist}|>n_o$. By the characteristic generator 17 described, the exact function $1/n_{ist}$ which is in itself desired, is sufficiently approximated in the range of interest.

The output of characteristic generator 17 is connected to the input of limiter circuit 10. The latter contains two ideal diode circuits, each of which comprises an operational amplifier 10a and 10c, respectively, the outputs of which are in series with a diode 10b and 10d, respectively. The terminals of the diodes 10b and 10d facing away from the output of the operational amplifier 10a and 10c are connected together at a junction point, the two diodes 10b and 10d having opposite polarity. These terminals of the diodes 10b and 10d, respectively, are also connected to the inverting input of the associated operational amplifier 10a and 10c, respectively. The output signal of the speed controller 1 to be limited is fed via a resistor 10f to the junction point of the two diodes 10b and 10d. The output signal of the characteristic generator 17 is fed directly to the non-inverting input of the operational amplifier 10c and to the non-inverting input of operational amplifier 10a via an inverter stage 10e. As long as the output signal of the speed controller 1 is between the output signal of the characteristic generator 17 and the inverted value thereof, the two ideal diode circuits 10a, 10b and 10c, 10d, respectively, are cut off, so that the output signal of the speed controller 1 is passed to the output of the limiter 10. If, however, the output signal of the speed controller 1 leaves this range, one of the two diodes 10b or 10d is switched into conduction by the associated operational amplifiers 10a or 10c, respectively, and the output signal of the limiter 10 is limited to the output signal of the characteristic generator 17.

Figure 8:
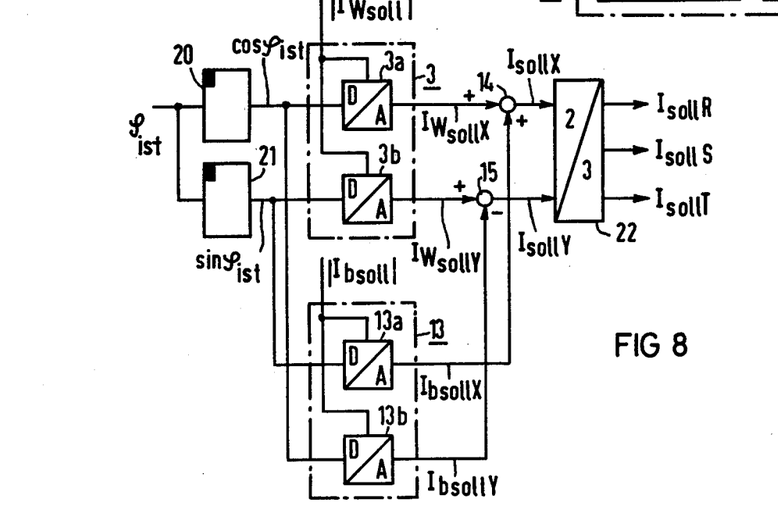

An embodiment of the vector rotators 3 and 13 is shown in FIG. 8. As per definition, the values $I_{Wsoll}$ and $I_{Bsoll}$ are vectors which are in the X-direction and are to be converted into rotating vectors for forming a rotating field. The reactive-current reference value $I_{Bsoll}$ is to be rotated relative to the active-current reference value $I_{Wsoll}$ by $+90°$. According to the trigonometric equations, a vector rotated about the X-axis by an angle $\phi$ has the following components in the Cartesian coordinate system:

$I_{sollX} = I_{soll} \cdot \cos \phi$ $I_{sollY} = I_{soll} \cdot \sin \phi$

If such a vector is rotated by 90° once more, one obtains:

$I_{sollX} = -I_{soll} \cdot \sin \phi$ $I_{sollY} = I_{soll} \cdot \cos \phi$

In order to rotate the vectors, the sine and the cosine of the position-measuring signal $\phi_{ist}$ must therefore be formed, which is provided digitally by the position pickup 8. This is accomplished, for instance, with read-only memories 20 and 21, at the addressing input of which, the actual position value $\phi_{ist}$ is present. The values of cos $\phi_{ist}$ and sin $\phi_{ist}$, which are related to the actual position value $\phi_{ist}$, are thereby addressed in read-only memories 20 and 21, respectively, and are delivered digitally at the output. The output of the read-only memory 20 is connected to a multiplying digital-to-analog converter 3a, and the output of the read-only memory 21 is connected to a multiplying digital-to-analog converter 3b. The analog active-current reference value $|I_{Wsoll}|$ is present at the multiplying inputs of the two digital-to-analog converters 3a and 3b. The product $I_{Wsoll} \cdot \cos \phi_{ist}$ is thus formed by the digital-to-analog converter 3a and the digital-to-analog converter 3b forms the product $I_{Wsoll} \cdot \sin \phi_{ist}$. Therefore, the X-component of the rotated active-current vector $I_W$ is present at the output of the digital-to-analog converter 3a and the Y-component of the rotated active-current vector $I_{Wsoll}$ is present at the output of the digital-to-analog converter 3b.

For rotating the reactive-current vector $I_{Bsoll}$, the output of read-only memory 20 is connected to the input of a multiplying digital-to-analog converter 13b, and the output of the read-only memory 21 is connected to the input of a multiplying digital-to-analog converter 13a, of second vector rotator 13. At the multiplier inputs of the digital-to-analog converters 13a and 13b the analog value $I_{Bsoll}$ is present. The product $I_{Bsoll} \cdot \sin \phi_{ist}$, i.e., the X-component of the rotated reactive-current vector, $I_{Bsoll}$, is formed by the digital-to-analog converter 13a. The product $I_{Bsoll} \cdot \cos \phi_{ist}$, i.e., the negative Y-component of the rotated reactive-current vector, $-I_{BsollY}$, is formed by the digital-to-analog converter 13b.

The X- and Y-components of the active-current vector, $I_{WsollX}$ and $I_{WsollY}$, and of the reactive-current vector, $I_{BsollX}$ and $I_{BsollY}$, respectively, are added in the adding stages 14 and 15, respectively, where the component $I_{BsollY}$ is fed to a subtraction input of the summing stage 15. At the output of summing stage 14, the X-component of the total current reference value $I_{sollX}$ is present, and at the output of the summing stage 15 the Y-component $I_{sollY}$ of the latter is present.

These two-phase variables are then converted by a coordinate converter 22 into a three-phase system $I_{sollR}$, $I_{sollS}$ and $I_{sollT}$. Such a coordinate converter is described, for instance, on page 7 of the European patent application No. 8110184, published on Sept. 2, 1981.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. In a control system for a synchronous machine having a rotor and a stator and having an exciting field of constant electromagnetic field strength and including a converter connected in series with the armature of the synchronous machine and an alternating current electrical supply network, the converter having an alternating current reference value as a control input, the phase of said current reference value controlled in dependence on the position of the rotor of the synchronous machine and the amplitude of said current reference value controlled in dependence on a first speed reference value, the converter having an output coupled to the synchronous machine for controlling the speed of rotation of the rotor of the synchronous machine, and further including means for determining the absolute value of the actual speed $n_{ist}$ of the rotor of the synchronous machine $|n_{ist}|$, the synchronous machine having at least one pair of input terminals, the terminal voltage across said input terminals comprising the vector sum of a voltage drop in the stator and a magnet-wheel voltage induced by the rotor, said input terminals being coupled to the output of the converter, the method for increasing the maximum speed of rotation of the rotor of the synchronous machine comprising the steps of:

generating a first signal proportional to the ratio of the absolute value of the actual speed of the rotor of the synchronous machine $|n_{ist}|$ to a second speed reference value $n_o$, said second speed reference value being a predetermined value of the speed of rotation of the rotor for which the sum of the magnet-wheel voltage and the voltage drop in the stator is equal to the maximum output of the converter;

limiting, for absolute values of actual speeds $|n_{ist}|$ greater than said second speed reference value, the amplitude of the current reference value to a value inversely proportional to said first signal;

generating a reactive-current reference value shifted 90° relative to the current reference value, the amplitude of said reactive-current reference value being proportional to the ratio of the value $1-n_o$ and the absolute value of the actual speed $|n_{ist}|$; and adding said reactive-current reference value to said current reference value to form an adjusted current reference value for controlling the converter.

2. The method recited in claim 1, wherein said second speed reference value is proportional to the line voltage of the supply network feeding the converter.

3. In a control system for a synchronous machine having a rotor and a stator, said synchronous machine having an exciting field of constant electromagnetic field strength, the armature of said synchronous machine being powered by an alternating current electrical supply network, and including:

first means for generating a first signal proportional to the position of the rotor of the synchronous machine;

second means, having said first signal as an input, for generating a second signal $n_{ist}$ proportional to the actual speed of the rotor of said synchronous machine;

third means, having said second signal as an input, for generating a third signal $|n_{ist}|$ proportional to the absolute value of the actual speed of the rotor of said synchronous machine;

fourth means, having said second signal and a first speed reference value as inputs, for generating a fourth signal proportional to the deviation of the actual speed $n_{ist}$ of the rotor of the synchronous machine from the speed reference value;

speed controller means having said fourth signal as an input for producing a speed control signal;

first coefficient multiplier means having as an input, said speed control signal, for producing an active current reference value amplitude signal proportional to said speed reference value;

first vector rotation means having said active current reference value amplitude signal as an input for generating a control signal, said vector rotation means having as a control input, said first signal, said control signal having a phase controlled by said first signal; and converter means connected in series with said synchronous machine and the electrical supply network, for producing an output voltage signal for controlling the speed of rotation of the rotor of the synchronous machine;

apparatus for increasing the maximum speed of rotation of the rotor of the synchronous machine comprising:

first limiting means, having as inputs, said third signal and a second speed reference value $n_o$, said second speed reference value being a predetermined value of the speed of rotation of the rotor for which said output voltage signal is a maximum, for limiting said speed control signal to a value inversely proportional to the ratio of said third signal to said second speed reference value;

first characteristic generating means, having as an input said third signal, for generating, as an output, a first characteristic signal which is substantially zero when said third signal is less than said second speed reference value and which is proportional to the quantity $(1-n_o/|n_{ist}|)$ when said third signal is greater than said second speed reference value;

second coefficient multiplier means having said first characteristic signal as an input for multiplying said first characteristic signal by a fixed value to produce a first characteristic amplitude signal;

second vector rotation means having said first characteristic amplitude signal as an input, said second vector rotation means further having as a control input, said first signal, for producing a reactive current reference value having a phase rotated 90° with respect to said first signal; and means for summing said control signal from said first vector rotator means with said reactive current reference value to produce an adjusted current reference value, said adjusted current reference value being coupled to said converter as a control input.

4. The apparatus recited in claim 3, wherein said first limiting means comprises:

second characteristic generating means, having as inputs, said third signal and said second speed reference signal, for generating, as an output, a second characteristic signal inversely proportional to the ratio of said third signal to said second speed reference value for values of said third signal greater than said second speed reference value and a limiter, said second characteristic signal coupled as a control input to said limiter.

5. The apparatus recited in claim 4, wherein said second charactertistic generating means comprises:

first summing amplifier means having an inverting input, a non-inverting input and an output, said third signal coupled to said inverting input and said second speed reference value coupled to said non-inverting input, said first summing amplifier means operating as an ideal rectifier and including first and second diodes coupled in opposite polarity from the output of said first summing amplifier means to the inverting input; and second summing amplifier means having as inputs, the output of said first summing amplifier means and a signal proportional to the maximum value of said active-current reference value, said second summing amplifier means having an output coupled to the control input of said limiter.

6. The apparatus recited in claim 4, wherein said limiter includes oppositely polarized first and second diode means having a common junction point, said speed control signal being coupled to said common junction point, the remaining terminals of said first and second diode means being coupled to the output of said second characteristic generating means.

7. The apparatus recited in claim 6, further comprising inverting means coupling the output of said second characteristic generating means to the remaining terminal of one of said diode means.

8. The apparatus recited in claim 3, wherein said first characteristic generating means comprises:

summing amplifier means, having a non-inverting input, an inverting input and an output, said third signal coupled to the non-inverting input, said second speed reference value coupled to the inverting input, said summing amplifier means operating as an ideal rectifier and including first and second diodes coupled in opposite polarity from the output of said summing amplifier means to the inverting input;

diode means coupling the output of said summing amplifier means to said third signal; and impedance matching means coupling the output of said summing amplifier means to the output of said first characteristic generating means.

* * * * *